US 9,094,548 B2

(12) United States Patent
Tsuya

(10) Patent No.: US 9,094,548 B2
(45) Date of Patent: Jul. 28, 2015

(54) INFORMATION PROCESSING DEVICE, METHOD AND STORAGE DEVICE STORING PROGRAM THEREFOR

(71) Applicant: Seiji Tsuya, Aichi (JP)

(72) Inventor: Seiji Tsuya, Aichi (JP)

(73) Assignee: BROTHER KOGYO KABUSHIKI KAISHA, Nagoya, Aichi (JP)

( * ) Notice: Subject to any disclaimer, the term of this patent is extended or adjusted under 35 U.S.C. 154(b) by 0 days.

(21) Appl. No.: 13/853,219

(22) Filed: Mar. 29, 2013

(65) Prior Publication Data
US 2013/0265606 A1    Oct. 10, 2013

(30) Foreign Application Priority Data

Mar. 30, 2012   (JP) ................. 2012-081046

(51) Int. Cl.
 *H04N 1/23*   (2006.01)
 *H04N 1/48*   (2006.01)
 *H04N 1/00*   (2006.01)
(52) U.S. Cl.
 CPC ........... *H04N 1/0035* (2013.01); *H04N 1/0023* (2013.01); *H04N 1/0048* (2013.01); *H04N 1/00225* (2013.01); *H04N 1/00472* (2013.01); *H04N 1/00482* (2013.01); *H04N 2201/0094* (2013.01)
(58) Field of Classification Search
 CPC ............ H04N 1/00225; H04N 1/0023; H04N 1/0035; H04N 1/00472; H04N 1/0048; H04N 1/00482; H04N 2201/0094
 USPC .................................. 358/1.1–1.9
 See application file for complete search history.

(56) References Cited

U.S. PATENT DOCUMENTS

| 4,839,829 | A | * | 6/1989 | Freedman | ...................... 715/751 |
| 7,218,976 | B2 | * | 5/2007 | Minagawa | ....................... 700/67 |
| 2006/0023247 | A1 | * | 2/2006 | Yamakawa | ................... 358/1.14 |
| 2006/0082802 | A1 | * | 4/2006 | Furuya | ......................... 358/1.13\ |
| 2007/0296995 | A1 | | 12/2007 | Sakura | |
| 2009/0180140 | A1 | * | 7/2009 | Kawamura | .................. 358/1.15 |

FOREIGN PATENT DOCUMENTS

JP        2008-3902 A       1/2008

OTHER PUBLICATIONS

Chinese Office Action dated Feb. 4, 2015 from related Chinese Application No. 201310110847.0, together with an English language translation.

\* cited by examiner

*Primary Examiner* — King Poon
*Assistant Examiner* — Ibrahim Siddo
(74) *Attorney, Agent, or Firm* — Scully, Scott, Murphy & Presser, P.C.

(57) ABSTRACT

There is provided an information processing device, in which a selection window allowing a user to select setting value for each of a plurality of setting items is displayed, the user operation indicating completion of selection of the setting value for each of the plurality of setting items is received. When the user operation indicating the completion of the selection is executed, whether a conflicting condition, in which the user attempts to set a plurality of setting values that are not allowed to be set simultaneously, occurs is judged. Then, a first resetting window showing one or a plurality of first effective setting values is displayed, which allows the user to select the one or the plurality of the first effective setting values when the conflicting condition occurs. The conflicting condition is resolved by receiving a setting value selected from the one or the plurality of first effective setting values when the conflicting condition occurs.

10 Claims, 10 Drawing Sheets

INFORMATION PROCESSING DEVICE, METHOD AND STORAGE DEVICE STORING PROGRAM THEREFOR

CROSS-REFERENCE TO RELATED APPLICATION

This application claims priority under 35 U.S.C. §119 from Japanese Patent Application No. 2012-081046 filed on Mar. 30, 2012. The entire subject matter of the application is incorporated herein by reference.

BACKGROUND

1. Technical Field

The present invention relates to an information processing device having a user interface configured to display various setting items and receive setting input, a method and a computer-readable storage device therefor.

2. Related Art

In information processing devices such as a personal computer, and peripheral devices such as a printer and a scanner, a user interface to be used by a user to set various setting items for executing respective functions is provided. It is common that such a user interface is configured to receive user operations (e.g., selection of enabling/disabling respective setting items, selection of setting values) using a keyboard and/or mouse are received with displaying a setting screen for receiving user input of respective setting items.

When a plurality of setting items are set, some setting items may have exclusive relationship. That is, some setting items may not be set simultaneously (e.g., setting of one setting item may restrict setting of another setting item). For example, if the number of colors for scanning an image is set to 256 colors, a resolution of the image is limited to 600 dpi or lower. In such a case, the number of colors and the resolution for scanning have exclusive relationship, and it is impossible to set the number of colors to 256 colors and the resolution to more than 600 dpi at the same time.

When such an exclusive relationship exists, the setting items are displayed as gray-out items, or removed from a selection item list so that the items having the exclusive relationship cannot be selected simultaneously.

SUMMARY OF THE INVENTION

In such a user interface, however, a user may be confused since he/she may not understand why such items are not selectable and/or how he/she can select such gray-out items. Depending on a device configuration, when the user selects a particular setting item which causes a conflicting problem between the selected setting item and another setting item, a set value of the other setting item may be automatically changed in order to avoid the conflicting condition between the setting items. As a result, the user may be confused since a result different from the user's intent may be output since the user does not realize such an automatic change of the setting value.

For such a problem, there has been known a user interface which is configured to judge whether a conflicting condition occurs mutually among setting items, and prompt a user to reset the settings by displaying a list of the conflicting items and an error message.

The above described conventional technique only displays a dialogue indicating the list of the conflicting setting items and an error message when the conflicting condition occurs. Therefore, the user can recognize that there occurs a conflicting condition mutually among a plurality of setting items. However, in order to resolve the conflicting condition, the user needs to close the dialogue, open a setting window for the corresponding setting items and make necessary change. Such a configuration is not convenient to the user.

The aspects of the present invention is intended to provide, in consideration of the above problem, an improved user interface with which the user can resolve the problem of conflicting setting items when the conflicting condition occurs.

In consideration of the above background, the present invention is advantageous in that there is provided an information processing device, having a display device, and a control device. The control device is configured to execute instructions to provide a setting value receiving unit configured to display a selection window allowing a user to setting value for each of a plurality of setting items, and to receive each by the user on the display unit, a selection completion operation receiving unit configured to receive the user operation indicating completion of selection of the setting value for each of the plurality of setting items, a conflicting condition judging unit configured to judge, when the selection completion operation receiving unit receives the user operation indicating the completion of the selection, whether a conflicting condition, in which the user attempts to set a plurality of setting values that are not allowed to be set simultaneously occurs, a first resetting unit configured to display a first resetting window showing one or a plurality of first effective setting values respectively corresponding to one of the conflicting setting values or a plurality of simultaneously selectable values and allowing the user to select the one or the plurality of the first effective setting values if the conflicting condition occurs, and a conflict resolving unit configured to resolve the conflicting condition by receiving user operation of selecting a setting value from the one or the plurality of first effective setting values if the conflicting condition occurs.

According to aspects of the invention, there is also provided an information processing device a display device and a control device. The control device is configured to execute processes of displaying a selection window allowing a user to select setting value for each of a plurality of setting items, receiving each selection of setting value by the user on the display device, receiving the user operation indicating completion of selection of the setting value for each of the plurality of setting items, judging, when the user operation indicating the completion of the selection is received, whether a conflicting condition in which the user attempts to set a plurality of setting values that are not allowed to be set simultaneously, occurs, displaying a first resetting window showing one or a plurality of first effective setting values respectively corresponding to one of the conflicting setting values or a plurality of simultaneously selectable values, receiving user selection of the one or the plurality of the first effective setting values when the conflicting condition occurs, and resolving the conflicting condition by receiving a setting value selected from the one or the plurality of first effective setting values when the conflicting condition occurs.

Configured as above, the information processing device judges whether conflicting condition occurs after the setting values have been set. when the conflicting condition occurs, the first resetting window is displayed to allow the user to select one of a conflicting setting values, which is validated. With such a configuration, when the conflicting condition occurs among a plurality of setting items, a user interface which enables resolution of the conflicting condition easily.

It is noted that the each unit provided to the information processing device according to the embodiment can be realized by a computer and a program that causes the computer to function as respective units.

BRIEF DESCRIPTION OF THE ACCOMPANYING DRAWINGS

DETAILED DESCRIPTION OF EMBODIMENT

Hereinafter, a preferred embodiment according to the invention will be described, referring to the accompanying drawings.

Figure 1:
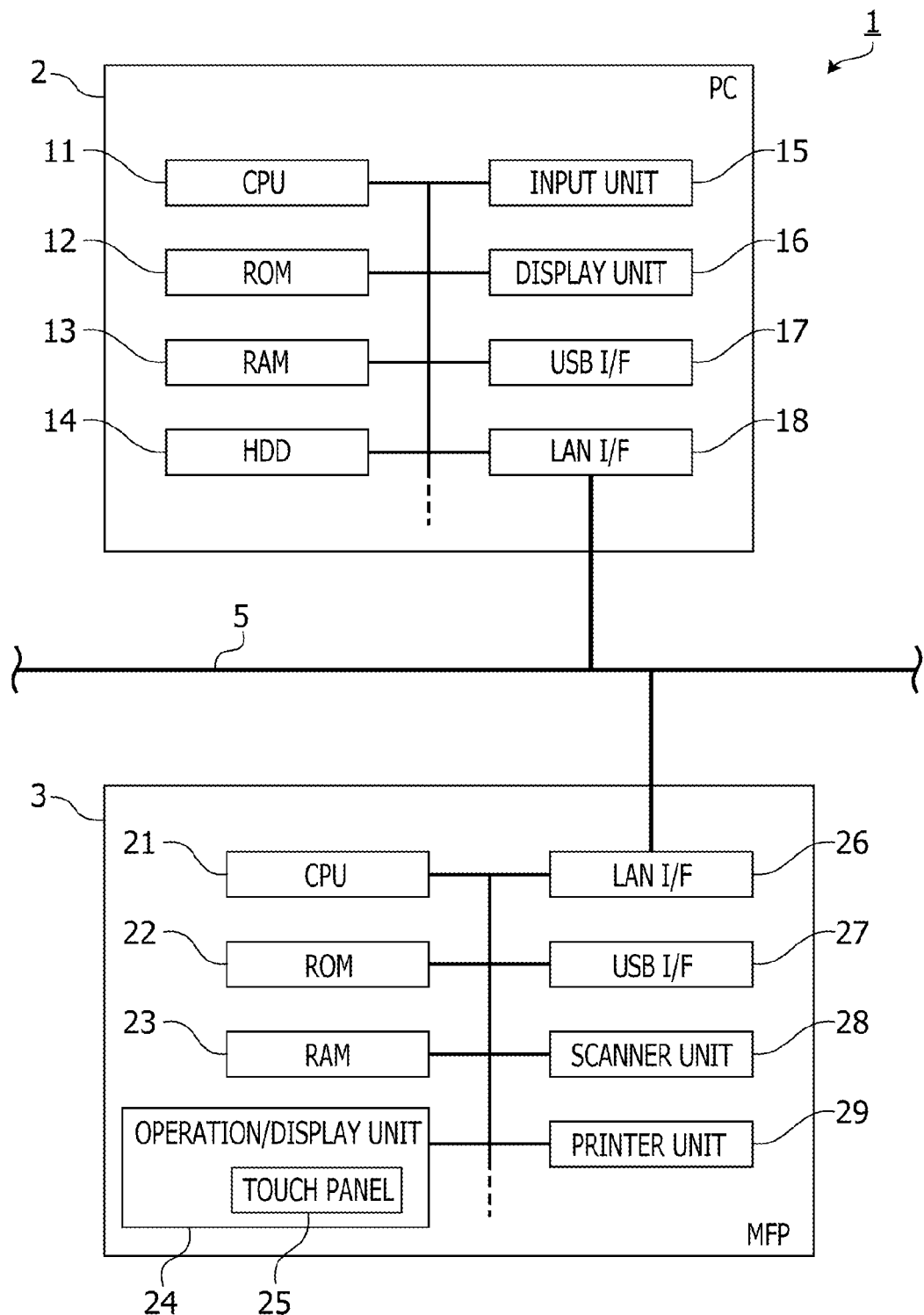
FIG. 1 is a block diagram schematically illustrating a configuration of an information processing system according to an embodiment of the present invention.

As shown in FIG. 1, an information processing system 1 according to the embodiment includes a personal computer (PC) 2 and an MFP (multi-function peripheral) 3 which are mutually communicably connected through a network 5. The MFP 3 is a multi-function device having functions of scanner for scanning an image on an original, printer for printing images on print medium such as print sheets, OHP sheets, and the like.

The PC 2, which serves as the information processing device and has a well-known configuration, includes a CPU (central processing unit) 11, a ROM (read only memory) 12, a RAM (random access memory) 13, a hard disk drive (HDD) 14, an input unit 15, a display unit 16 a USB (universal serial bus) interface 17, a LAN (local area network) interface 18, and the like. The display unit 16 includes a display device such as a liquid crystal display.

In the HDD 14, various kinds of software (programs) are installed. Among them, software with which the PC 2 communicates with the MFP 3 and controls the scanning function of the MFP 3 to scan an image, receives image data generated by the MFP 3 from the MFP 3 is included (hereinafter, such software will be referred to as scan-compliant software).

The scan-compliant software is configured such that the user can set various setting items (e.g., the number of colors, resolution, the size of an original, etc.) used for scanning with the MFP 3. Thus, when the user of the PC 2 uses the scan-compliant software to send an instruction to start scanning from the PC 2 and/or when a scan even designating the PC 3 is received from the MFP 3 and the scan-compliant software is started, setting values of the various setting items, which have been set for the scan-compliant software are transmitted to the MFP 3. Then, the MFP 3 executes the scanning using the thus received (i.e., transmitted from the PC 2) setting values.

The MFP 3 is provided with a CPU 21, a ROM 22, a RAM 23, an operation/display unit 24, a LAN interface 26, a USB interface 27, a scanner unit 28 and a printer unit 29.

The CPU 21 is configured to control respective units of the MFP 3 and executes various operations in accordance with various programs and data stored in the ROM 22. The RAM 22 is used as a main memory which is directly accessed by the CPU 21. The operation/display unit 24 has a touch panel 25 and various operation buttons (not shown) to receive user's operation. The scanner unit 28 has an image sensor and scans an image on an original and generates image data representing the scanned image. The printer unit 29 is configured to print images on the print medium.

Figure 2A:
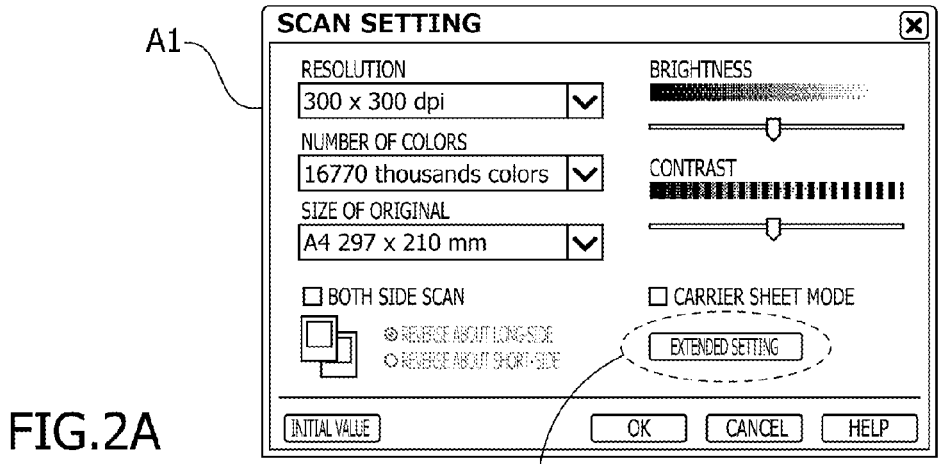
FIGS. 2A, 2B, 2C and 2D show examples of scan setting windows and extended setting windows which are displayed when setting items for scanning are set.

Next, concrete user's operations in which the user can set setting values of each of the setting items for scanning with the scan-compliant software, and respective setting procedures will be described in detail. In order for the user of the PC 2 to set respective setting items, the user firstly starts the scan-compliant software in the PC 2. When a predetermined operation to call up a scan setting window when the scan-compliant software is running, the scan setting window A1 (initial window) shown in FIG. 2A is displayed on the display unit 16.

Figure 2B:
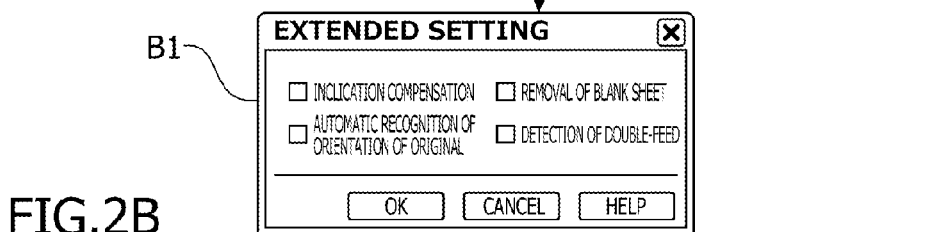

When the user performs certain operation to set/select desired settings on the scan setting window A1, the user can set desired setting values to the respective setting items. The example of the setting window A1 shown in FIG. 2A is configured such that the user can set the setting items of resolution, the number of colors, original size, both-side scanning, brightness, contrast, and carrier sheet mode. When the user clicks an "EXTENDED SETTING" button shown in the setting window A1, an extended setting window B1 (initial) window as shown in FIG. 2B is displayed. In the exemplary extended setting window B1 shown in FIG. 2B, the user can set the setting items of inclination compensation, removal of blank sheet, automatic orientation recognition and double feed detection.

Among the setting items, ones of both-side scanning, carrier sheet mode, inclination compensation, blank-sheet removal, automatic orientation recognition and double feed detection are so-called true-false setting items, and the user selects whether each functions is used or not (i.e., whether each function is effective when the scanning is executed). For example, when the user checks a check box for the "both-side scanning" in the scan setting window A1, the function of both-side scanning is effective, and the MFP 3 scans a double-sided original automatically.

In contrast, the setting items of resolution, the number of colors, original size, brightness and contrast are so-called multiple-choice setting items, in which a selected one of a plurality of predetermined setting values selectable for each setting item is set. For example, when the user intends to set the resolution for scanning to 600 dpi (dots per inch), the user simply selects 600 dpi in a drop-down list for the setting item of the resolution in the scan setting window W1. The, the 600 dpi is set as the resolution when scanning is executed.

When the scan-compliant software is started and the scan setting window is firstly displayed, a default setting value is set to each setting item. The exemplary windows shown in FIGS. 2A and 2B are the initially displayed windows in which each setting item is set to the default setting value. The default values are predetermined for respective setting items. Regarding the true-false setting items, each check box is shown in an unchecked state (i.e., the function is not effective). It should be noted that the setting values initially set need not be limited to the default values, and previously set setting values may be retained and displayed as the initial setting values.

Incidentally, the setting items shown in the scan setting window A1 include the "carrier sheet mode," while the setting items shown in the extended setting items include the "inclination compensation" and the "double feed detection." Due to a specification of the MFP 3 according to the exemplary embodiment, the carrier sheet mode and the inclination compensation or the double feed detection have an exclusive relationship. That is, the carrier sheet mode and the inclination compensation cannot be set (i.e., made effective) simultaneously. Similarly, the carrier sheet mode and the double feed detection cannot be set (i.e., made effective) simultaneously.

According to the specification of the conventional scan-compliant software, if the user puts a check to the "carrier sheet mode" in the scan setting window (i.e., the carrier sheet mode is made effective), and then the user opens the extended setting window, the setting items of the "inclination compensation" and the "double feed detection" are displayed in a gray-out manner (i.e., displayed as items which cannot be set). In such a case, the user may be confused since he/she may not understand why the setting items are indicated as gray-out items, with what operation the gray-out setting items turn to be selectable. Similarly, if the user firstly puts checks to the "inclination compensation" and/or the "double feed detection" in the extended setting window, and then returns to the scan setting window, the "carrier sheet mode" is displayed as a gray-out setting item, which is not selectable. In such a case, the user is also confused.

The above example of the exclusive relationship (i.e., conflicting relationship) is a relationship between the true-false setting items. It is noted that, according to the exemplary embodiment, the conflicting relationship also exists between the true-false setting item and the multiple-choice setting item, and between the multiple-choice setting items.

For example, the both-side scanning and the original size of longer than an A4 size sheet cannot be selected simultaneously since they mutually conflict with each other. In the conventional art, if the user puts a check to the "both-side scanning" in the scan setting window, and then displays a drop list of the "original size", sizes longer than the A4 size are not displayed in the drop list. Then, the user may be confused since he/she does not know why the original sizes longer than the A4 size are not selectable, or how to select the longer sizes. Alternatively, if the user selects the original size (e.g., A3 size) longer than the A4 size, and then puts a check to the "both-side scanning", the original size is automatically changed to the A4 size, according to the conventional specification. In such a case, the user may be confused since he/she does not understand the reason why the original size is automatically changed to the A4 size.

For example, the resolution and the number of colors have the conflicting relationship. That is, normally, the user can select one of the resolutions which are values determined stepwise within a range from 100 dpi to 19200 dpi. The number of colors can be selected from "black and white", "gray", "256-step gray scale", "256 colors", "16770 thousand colors", and the like.

However, if the user has selected the "256 colors" as the number of colors, the resolution that can be set is limited to 600 dpi or lower. Thus, the "256 colors" and the resolution greater than 600 dpi conflict with each other, and cannot be set at the same time. In the conventional art, for example, if the user has selected the resolution of 1200 dpi and views the drop down list for the number of colors, "256 colors" is not included in the list, which causes the user to be confused.

In contrast, according to the exemplary embodiment, the user can select any setting item in each of the scan setting window and the extended setting window without being hindered in selecting the setting values.

Figure 2C:
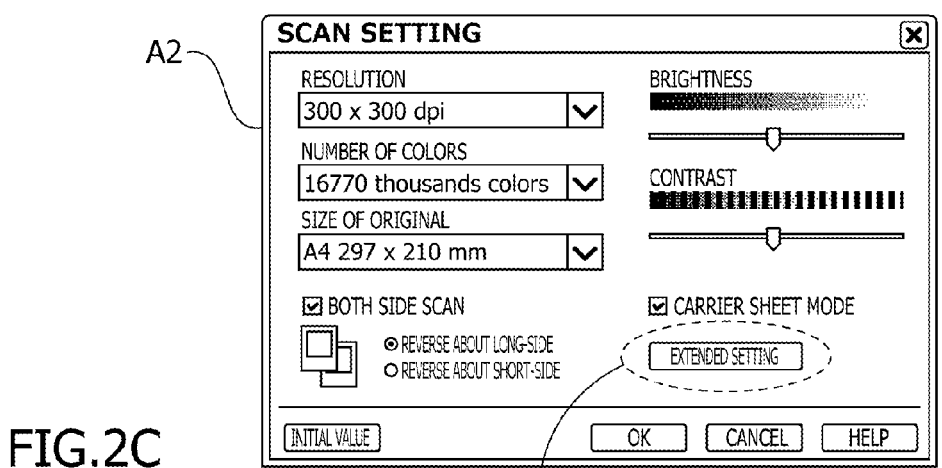
Figure 2D:
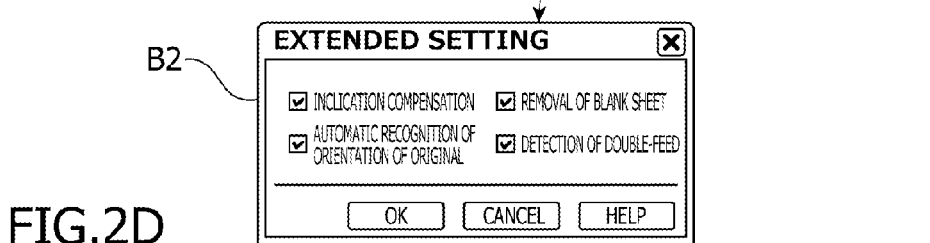

That is, according to the exemplary embodiment, even if the user puts a check for the "carrier sheet mode" in the scan setting window, the user is allowed to select any setting items including the conflicting setting items of the "inclination compensation" and the "double feed detection" or vice versa. In other words, at a stage where the user is selecting/determining the setting values, the user is allowed to select/determine respective setting values without being bothered by the restriction due to the conflicting relationship. Thus, at the stage of setting/selecting, as shown in FIG. 2C (i.e., the scan setting window A2) and FIG. 2D (i.e., the extended setting window B2), the user can set the setting values freely even if the setting items/values have the conflicting relationship.

After the user's setting/selection has completed and an operation to confirm the user's intention is made in the scan setting window (i.e., the "OK" button is clicked), whether there are setting values having the conflicting relationship is judged.

Figure 4:
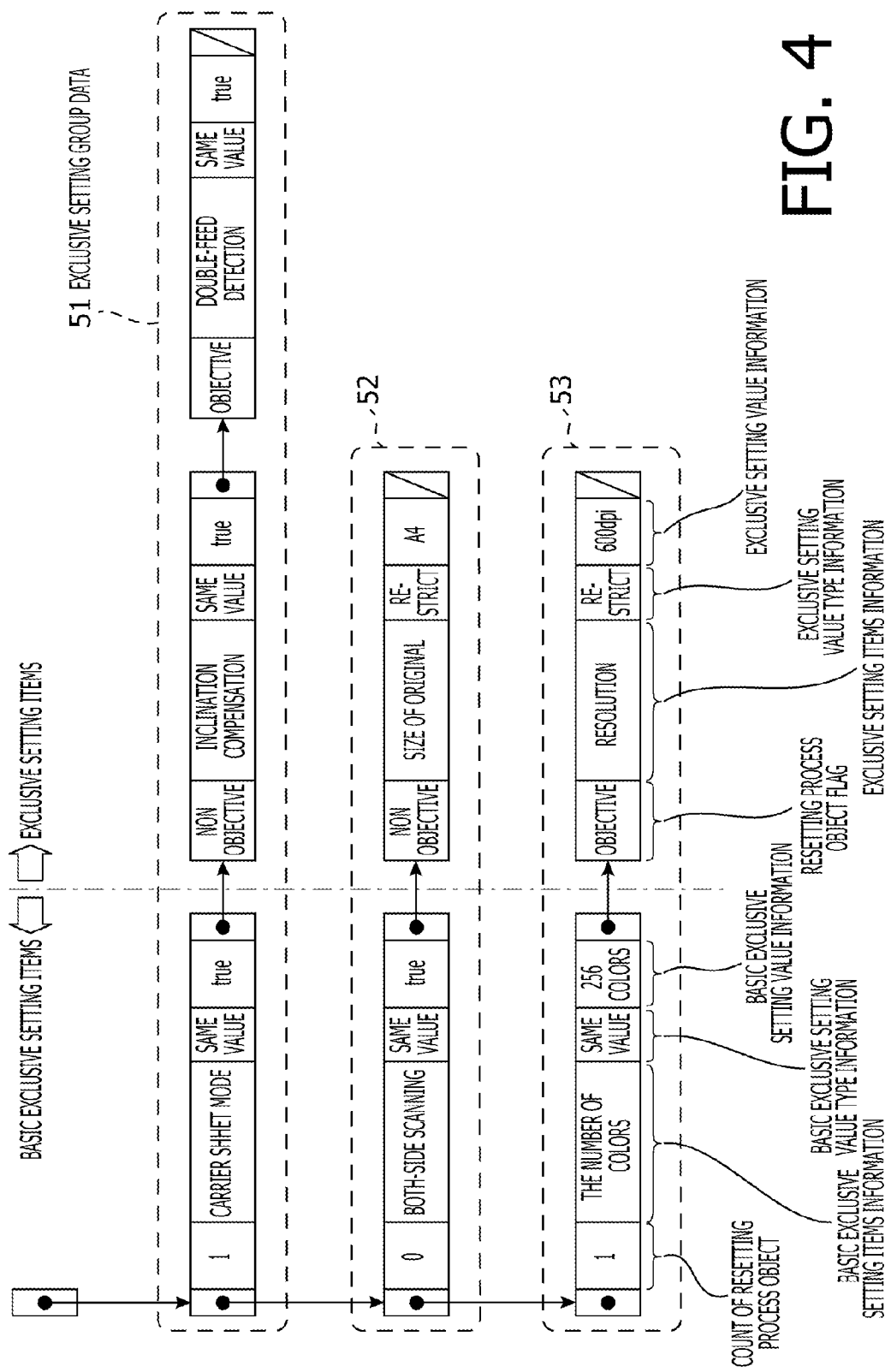
FIG. 4 is a chart illustrating a data structure of a conflicting group list which is used for checking the conflicting of the setting values in the PC.

Judgment as to whether there are conflicting setting values is made with referring to the conflicting group list shown in FIG. 4. The conflicting group list is a pre-stored data structure which is stored in the HDD 14 of the PC 2. The conflicting group list shows a combination of mutually conflicting setting values for each setting item as a conflicting group (i.e., exclusive setting group data), and a plurality of pieces of the exclusive setting group data are listed. Specifically, in the example shown in FIG. 4, three pieces of exclusive group data 51, 52 and 53 are listed in this order. A first piece of exclusive setting group data 51 indicates a combination of mutually conflicting three items: the carrier sheet mode; the inclination compensation; and the double feed detection.

Within one exclusive setting group data, a basic exclusive setting item is arranged at a top of the group data followed by the exclusive setting item which is a setting item conflicting with the basic exclusive setting item.

Regarding the first exclusive setting group data 51, the carrier sheet mode is the basic exclusive setting item, and the inclination compensation and the double feed detection are arranged as exclusive setting items subsequently. The basic exclusive setting item, which is arranged at the top of the exclusive setting group data, is referred to firstly when the conflicting is checked. Specifically, the basic exclusive setting item includes basic exclusive setting item information representing a name of the setting item, basic exclusive setting value information representing a basic exclusive setting value which is a setting value causing the setting item to conflict with the conflicting setting item, basic exclusive setting value type information representing a type of the basic exclusive setting value, and a re-setting process object count.

The basic exclusive setting value type information may represent at least two types: "same value" and "restrict value." The "same value" means that there is a possibility that the conflicting condition occurs if the same setting values as the basic exclusive setting value set to the basic exclusive setting value information is selected. The "restrict value" means that there is a possibility that the conflicting condition occurs if a setting value exceeding a threshold value, which is the basic exclusive setting value set to the basic exclusive setting value information, is selected. Incidentally, a value "true" in the basic exclusive setting value information is a value set to the true-false setting item, and means that the setting item is currently valid.

For example, the basic exclusive setting item of the first exclusive setting group data 51 indicates that there is a possibility that the setting item conflict with another setting item/value if the setting value selected for the carrier sheet mode is the same as the basic exclusive setting value (i.e., true), that is the carrier sheet mode is currently available. For another example, the basic exclusive setting item in the third exclusive setting group 53 represents that there is a possibility that the setting item conflicts with another setting item/value if a setting value selected as the number of colors is the same as the basic exclusive setting value (i.e., 256 colors), that is if the "256 colors" is selected. It is noted that the count of resetting process object has an initial value of zero and incremented by one every time when another setting value conflicting with the present basic exclusive setting item is found in a process of conflicting check.

In each of the pieces of exclusive setting group data 51, 52 and 53, the exclusive setting items, which are arranged next to the basic exclusive setting item at the top, are subsequently referred to when the setting value identical to the basic exclusive setting item. Specifically, the exclusive setting items include exclusive setting item information, exclusive setting value information, exclusive setting value type information and re-setting process object flag.

Among them, the exclusive setting item information, the exclusive setting value information and the exclusive setting value type information correspond to the basic exclusive setting item information, basic exclusive setting value information and basic exclusive value information, respectively. Meaning and relationship among the exclusive setting item information, the exclusive setting value information and the exclusive setting value type information are the same as those among the basic exclusive setting item information, basic exclusive setting value information and basic exclusive value information.

For example, if the complete check is performed when the carrier sheet mode and the double feed detection are selected and the inclination compensation is not selected, firstly a check based on the first exclusive setting group data 51 is executed. It is judged whether a value identical to the value set as the basic exclusive setting item (i.e., the carrier sheet mode in this example) is selected. Since, in this example, the carrier sheet mode is selected, it is judged that, regarding at least the basic exclusive setting items, the same setting value is selected, and judgment regarding the next setting item (i.e., inclination compensation) is done. In this example, since the inclination compensation is not selected, the resetting process object flag of the inclination compensation is remained to be the initial value of "non objective", and the count of resetting process object of the basic exclusive setting item is also remained to be the initial value of zero. Further, the next exclusive setting item (i.e., double feed detection) is examined to judge whether the contained value is identical to the set value (i.e., double feed detection being selected). In this example, since the double feed detection is selected, the resetting process object flag of the double feed detection is set to "object" and the count of the resetting process object of the basic exclusive setting item is incremented by one (i.e., set to "1").

For another example, if the complete check is performed when the both-side scan is selected and A4 size is selected as the original size, firstly a check based on the first exclusive setting group data 51 is executed. In this example, since the double-side scan does not match the carrier sheet mode that is set to the basic exclusive setting item, upon judging the same, judgment based on the first exclusive setting group data 51 is terminated, and judgment based on the second exclusive setting data group 52 will be performed. Initially, it is judged whether a setting value identical to the value set to the basic exclusive setting item (i.e., both-side scan) is selected. In this example, since the both-side scan is selected, at least regarding the basic exclusive setting item, it is judged that the same value is selected. Then, judgment regarding the next exclusive setting item will be performed. Regarding the next exclusive setting item (i.e., original size), since the exclusive setting value type is "restrict", it is judged whether the selected original size is larger than the set value "A4 size" which has been set to the exclusive setting value. Since the A4 size is selected as the original size in this example, the resetting process object flag regarding the original size is remained to be the initial value of "non objective" and the count of the resetting process object of the basic exclusive setting item is remained to have the initial value of zero.

Description on setting and resetting of the setting items will be continued. In the scan setting window (see FIG. 2A, FIG. 2C), when the "OK" button is clicked, the examination of the competition (or the conflicting check) based on the conflicting group lists (FIG. 4) is executed. As a result of the examination of competition (or conflicting check) if it is judged that there are setting values which has a conflicting relationship, a message indicating the conflicting condition and a resetting window (FIGS. 3A-3D) are displayed to urge the user to perform re-selection (i.e., re-set).

Figure 3A:
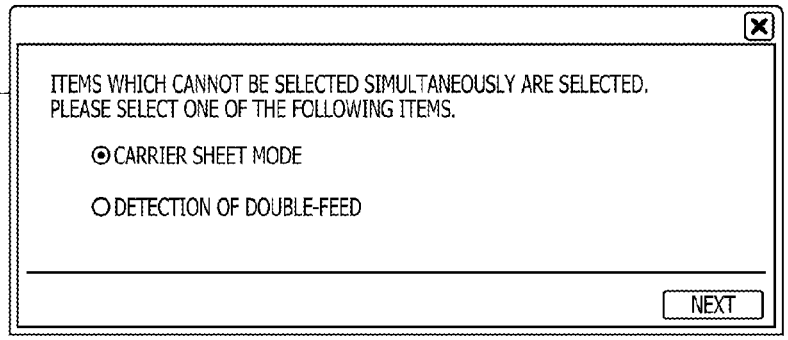
FIGS. 3A, 3B, 3C and 3D show examples of resetting windows and selection resetting windows which are displayed when completing of setting values occur in a PC.

For example, if both the "carrier sheet mode" and the "double feed detection" are checked and the setting operation is completed (i.e., the OK button is clicked), the conflicting condition between the two settings in the conflicting check, and a resetting window'A1 as shown in FIG. 3A is displayed.

Figure 3B:
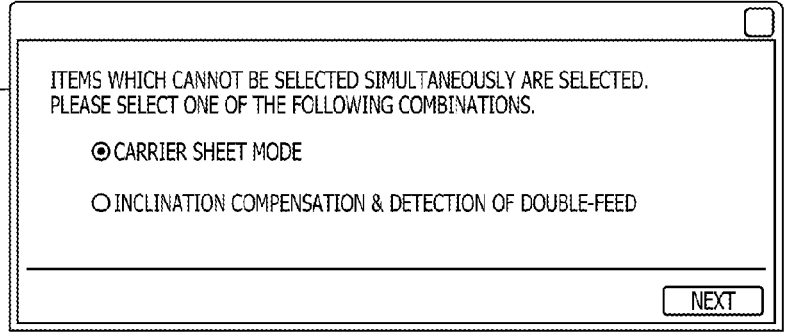

In the resetting window A1 (FIG. 3A), a message indicating that items which cannot be set/selected at the same time are currently set/selected, and such items are displayed as a selection list. On left side of each setting items on the list, a radio button (with which the user select one of the items) is provided. On this window, the user can reselect one of the "carrier sheet mode" and the "double feed detection". When the user makes a reselection, the reselected item is made valid, while unselected items are made invalid and the conflicting condition is resolved. For example, if the "carrier sheet mode" is reselected and made valid, the "double feed detection" is invalid. In the resetting window A1, the user is urged to select only one item. However, since all the conflicting items are displayed in the same window, the user can examine and select the important one of the listed items. If all the "carrier sheet mode", "double feed check" and "inclination compensation" are checked, the resetting window A2 as shown in FIG. 3B may be displayed. In this case, if the user selects the "carrier sheet mode", it is made valid, while the "double feed detection" and the "inclination compensation" are made invalid.

If there are a plurality of conflicting combinations, it is possible to display all the conflicting combinations in one window, or it is also possible to display one conflicting combination in one window. In the latter case, simply by showing a "NEXT" button to be clicked by the user on the resetting window, other windows respectively showing other conflicting combinations can be displayed subsequently.

If at least one of the conflicting setting items is the multiple-choice item, the resetting window shows the fact that a plurality of setting items which cannot be set at the same time and the conflicting setting items, one of which is to be selected, are displayed (for the multiple-choice setting items, currently selected setting values are displayed). Further, for the multiple-choice setting item, if there are one or more selectable values, explanation of such selectable values (e.g., a selectable value range) is also displayed. For example, when the "256 colors" is selected as the number of colors, and the "1200 dpi" is selected as the resolution, since these setting items conflict with each other, the resetting window B as shown in FIG. 3C is displayed.

Figure 3C:
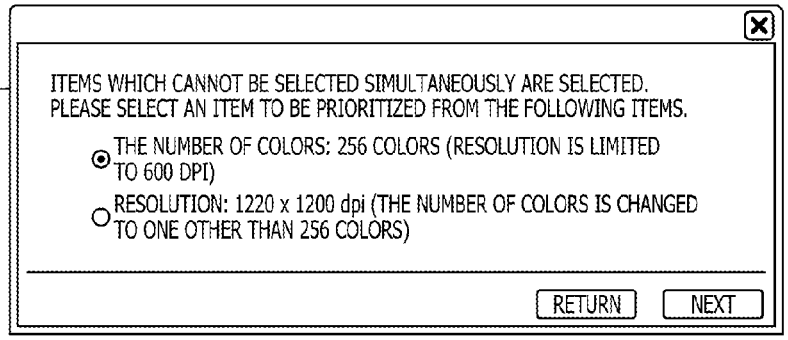

In the resetting window B as shown in FIG. 3C, each setting items/values (256 colors, and 1200 dpi) is displayed, and a message that the items cannot be selected simultaneously, and one of the items the user wishes to prioritize should be selected is indicated. Further, on the right side of the item of the number of colors, an indication notifying that the user only can select the resolution of 600 dpi or less if the user selects (i.e., prioritize) the number of colors (i.e., if the number of colors is 600 dpi or less, both setting items can be selected). In addition, on the right side of the item of the resolution, an indication notifying that the user only can select the number of colors is changed to the number other than 256 colors if the user selects (i.e., prioritize) the resolution of 1200 dpi. As shown in FIG. 3C, a radio button is arranged on the left side of each setting item, which allows the user to select one of the 256 colors and the 1200 dpi resolution. When the user re-selects the setting item, the selected setting item/value becomes effective.

Figure 3D:
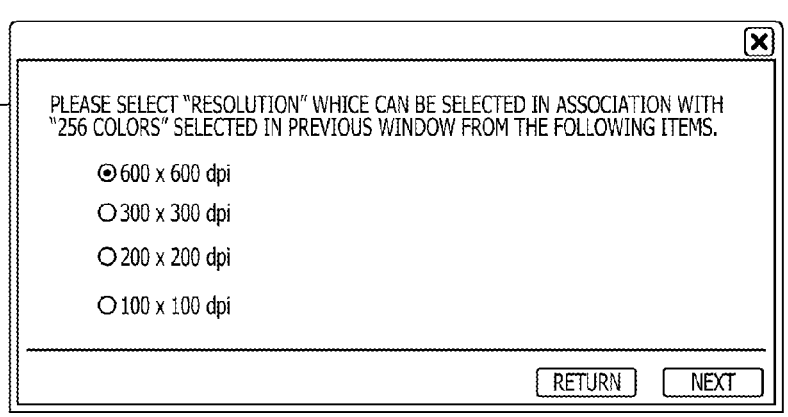

If the setting item which is not selected in the resetting window B shown in FIG. 3C is the multiple-choice setting item, another window (i.e., a multiple-choice resetting window) as shown in FIG. 3D is displayed. The example shown in FIG. 3C is a window when the two multiple-choice setting items conflict with each other. If the "256 colors" is selected in the resetting window B in FIG. 3C, the multiple-choice resetting window shown FIG. 3C indicates a list of settable values (i.e., non-conflicting setting values) when the "256 colors" is selected. With this configuration, the user can re-select the resolution within a range, which does not conflict with the "256 colors".

Meanwhile, if the user selects the resolution of 1200 dpi in the resetting window B (FIG. 3C), that is if the user intends to prioritize the resolution, and clicks the "NEXT" button, a list of the numbers of colors, which can be set without conflicting with the resolution of "1200 dpi", is displayed in the multiple-choice resetting window. In this case, therefore, the user can select the number of colors within a limited range, which does not conflict with the selected resolution.

As described above, in the multiple-choice resetting window, a list of non-conflicting setting values for the setting item(s), which is(are) not selected by the user in the resetting window B is(are) displayed. The user can select any one of the listed setting values within a limited range, without causing the conflicting condition.

As well-known, if the user clicks the "RETURN" button in the multiple-choice resetting window (FIG. 3D), control returns to the resetting window B (FIG. 3C), and the user can select the setting item to be prioritized again. In the multiple-choice resetting window (FIG. 3D), if the number of selectable values are too many, the list may be displayed using a well-known drop down list.

Next, a setting window display process, which is executed when a predetermined operation is performed to display the scan setting window after the scan-compliant software is started in the PC 2 referring to flowcharts shown in FIGS. 5-9. When the setting window display process is started, the CPU 11 of the PC 2 generates a dialogue of the scan setting window (FIG. 5: S110), retrieves current setting values from the setting data stored in the HDD 14 (S120), and sets controls on the dialogue. The setting values set at this stage may be predetermined initial values (i.e., default values) or previously set values which were used when the setting window process was previously executed. The CPU 11 generates the dialogue in an area on the RAM 13. Based on the thus generated dialogue, the CPU 11 displays the scan setting window (i.e., the initial window shown in FIG. 2A) in S130.

Next, the CPU 11 judges whether a mouse is operated (S140). If the mouse is operated (S140: YES), the CPU 11 judges whether the "OK" button is clicked (S150). If the "OK" button is not clicked (S150: NO), the CPU 11 executes a process corresponding to an operated control (S170), and returns to S140. Thus, in S170, settings/selections of various setting items performed by the user on the scan setting window and extended setting window are received. If the "OK" button is clicked (S150: YES), the CPU 11 proceeds to S160, where a conflicting values checking process for exclusive setting items is called.

Figure 6A:
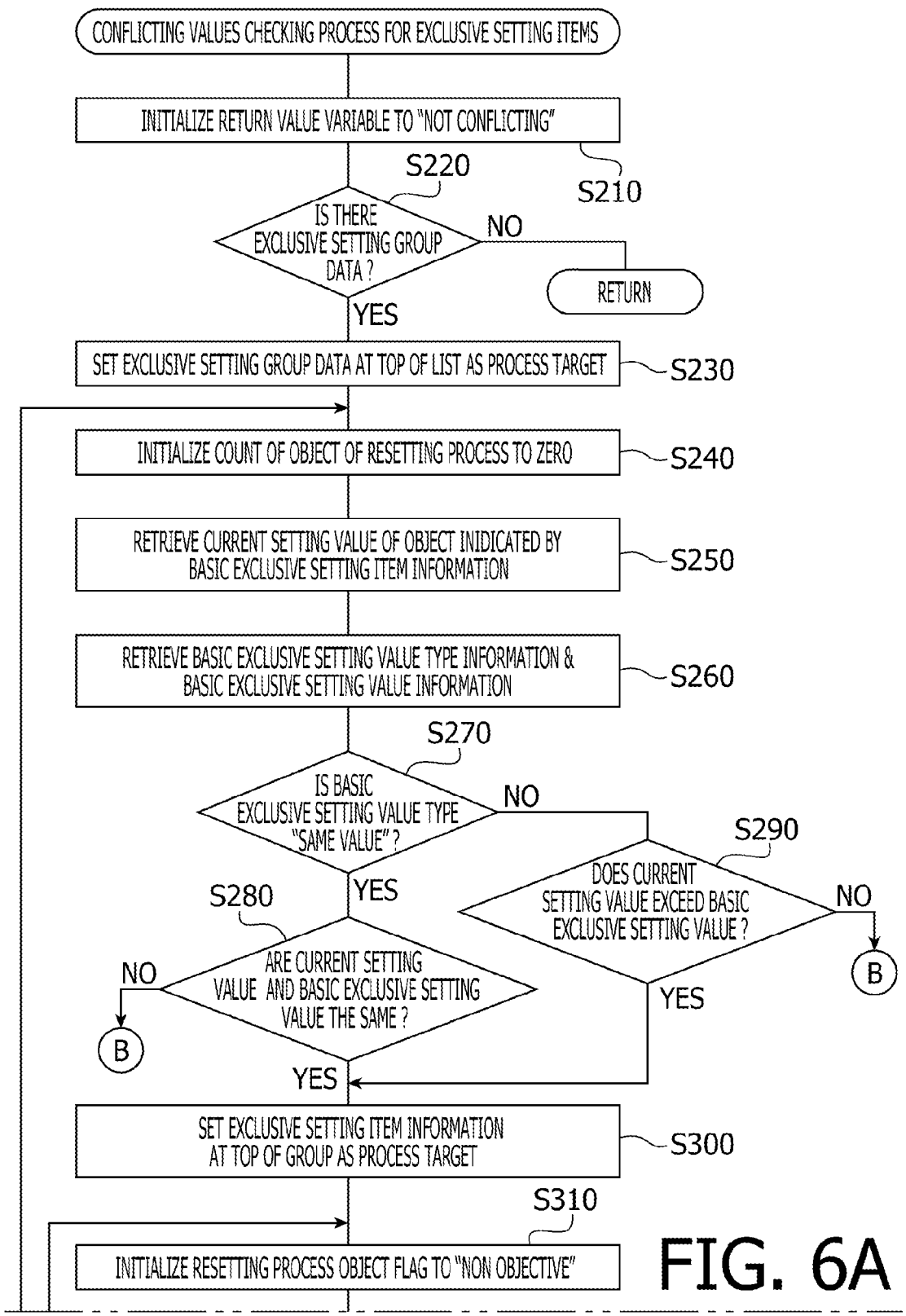
FIGS. 6A and 6B are a flowchart illustrating a conflicting values checking process for exclusive values, which process is called in the setting window display process shown in FIG. 5.
Figure 6B:
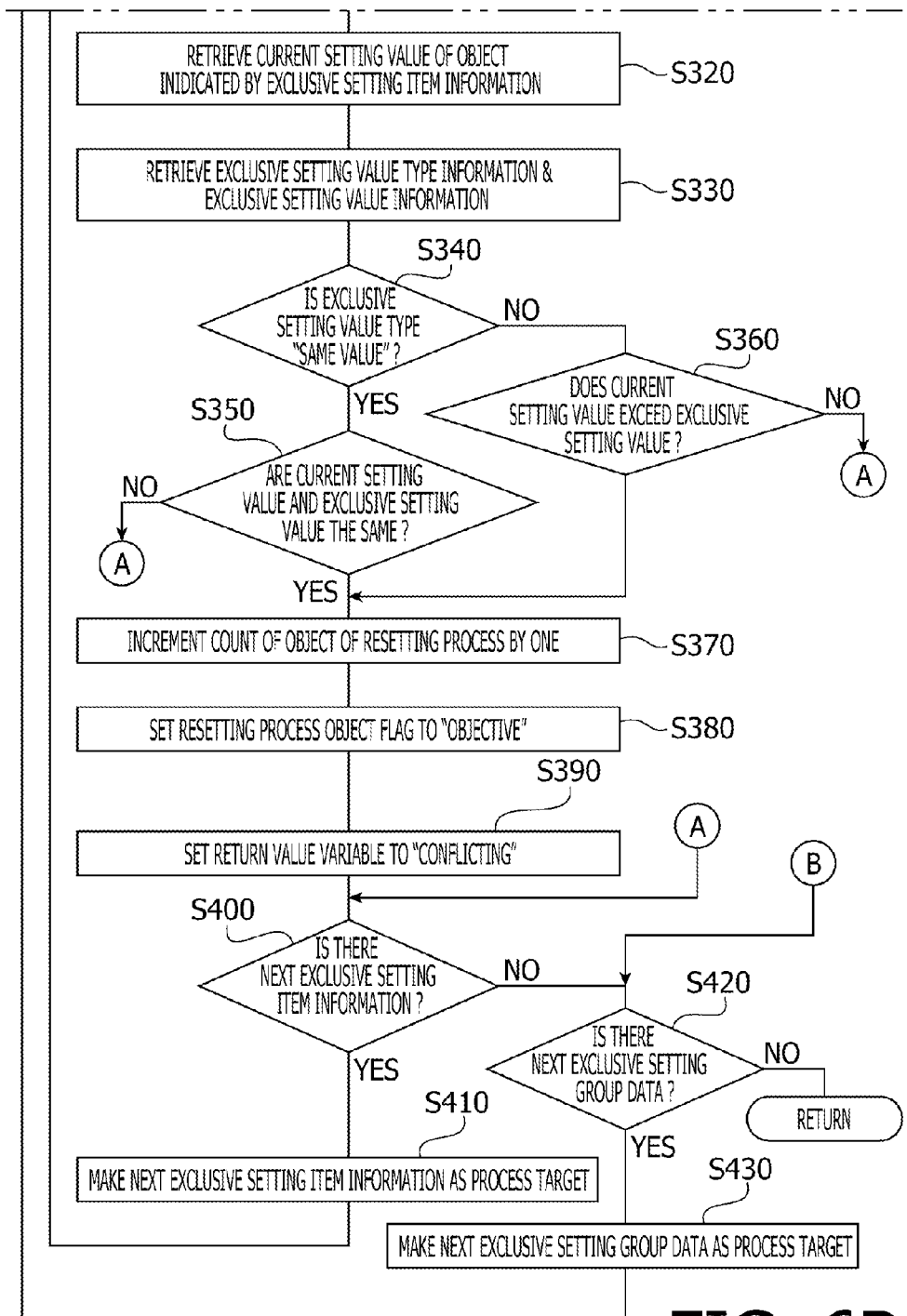

The conflicting values checking process is shown in FIGS. 6A and 6B. The CPU 11 initialize a return variable to "NOT CONFLICTING" (S210), and judges whether there is exclusive setting group data in the conflicting group list (FIG. 4) in S220. If there is no exclusive setting group data in the conflicting group list (S220: NO), the conflicting values checking process is terminated. If there is the exclusive setting group data (S220: YES), the CPU 11 set the exclusive setting group data at the top of the conflicting group list (e.g., in the example of FIG. 4, the first exclusive setting group data 51) as the data subject to the process (S230) and the CPU 11 proceeds to S240.

In S240, the CPU 11 initializes the count of object of resetting process of the exclusive setting group data (i.e., sets to zero), and retrieves the current setting value (i.e., the setting value actually selected in the scan setting window) of an object to be processed, which is indicated by the basic exclusive setting item information. For example, when the first exclusive setting group data 51 is the object to be processed, the CPU 11 retrieves the setting value of the carrier sheet mode (i.e., whether the carrier sheet mode is selected or not) in S250. Then, in S260, the CPU 11 retrieves the basic exclusive setting value type information and the basic exclusive setting value information, and the CPU 11 judges whether the basic exclusive setting value type is the "SAME VALUE" or not.

If the basic exclusive setting value type is the "SAME VALUE" (S270: YES), the CPU 11 judges whether the current setting value is equal to the basic exclusive setting value (S280). If the current setting value is not equal to the basic exclusive setting value (S280: NO), the CPU 11 proceeds to S420. If the current setting value is equal to the basic exclusive setting value (S280: YES), the CPU 11 proceeds to S300 as the same value is selected for at least the basic exclusive setting item. In other words, if the carrier sheet mode is selected in the above example, the CPU 11 proceeds to S300.

If the basic exclusive setting value type is not the "SAME VALUE" (i.e., the type is the "RESTRICT"), the CPU 11 judges whether the current setting value exceeds the basic exclusive setting value (S290). If the current setting value does not exceed the basic exclusive setting value (S290: NO), the CPU 11 proceeds to S420. If the current setting value exceeds the basic exclusive setting value (S290: YES), which means that the selected setting value of at least the currently examined basic exclusive setting item may cause the conflicting condition, and the CPU 11 proceeds to S300.

In S300 onwards, the CPU 11 judges whether conflicting exclusive setting items are actually selected. Specifically, the CPU 11 sets top exclusive setting item information in each exclusive setting item in the exclusive setting group data subject to the process in S300. Then, the CPU 11 initializes the resetting process object flag to "NON OBJECTIVE" in S310. In S320, the CPU 11 retrieves the current setting value of the object designated by the exclusive setting item information (i.e., the setting value actually selected in the scan setting window). For example, if the inclination compensation in the first exclusive setting group data 51 is the current object, the CPU 11 retrieves the setting value (i.e., whether it is selected or not) of the inclination compensation. Then, in S330, the CPU 11 retrieves the exclusive setting value type information and exclusive setting information, and judges whether the exclusive setting value type is the "SAME VALUE" or not in S340.

If the exclusive setting value type is the "SAME VALUE" (S340: YES), the CPU 11 judges whether the current setting value is equal to the exclusive setting value in S350. If the current setting value is not equal to the exclusive setting value (S350: NO), the CPU 11 proceeds to S400. If the current setting value is equal to the exclusive setting value (S350: YES), the CPU 11 proceeds to S370 as the same setting value is selected at least regarding the currently processed exclusive setting item. That is, in the above example, if the inclination compensation is selected, the CPU 11 proceeds to S370.

If the exclusive setting value type is not the "SAME VALUE" (i.e., the value type is "RESTRICT"), the CPU 11 judges whether the current setting value exceeds the exclusive setting value (S360). If the current setting value does not exceed the exclusive setting value (S360: NO), the CPU 11 proceeds to S400. If the current setting value exceeds the exclusive setting value (S360: YES), the CPU 11 proceeds to S370 as the setting value regarding the currently processed exclusive setting item causes the conflicting condition.

In S370, the CPU 11 increments the count of the resetting process object of the exclusive setting group data subject to process by one, and sets the resetting process object flag of the exclusive setting item of the processed object to "OBJECTIVE" (S380). In S390, the CPU 11 sets the return variable to "CONFLICTING". In S400, the CPU 11 judges whether there is next exclusive setting item information in the processed exclusive setting group data.

If the there is no next exclusive setting item information (S400: NO), the CPU 11 judges whether there is next exclusive setting group data in the conflicting group list (S420). If there is the next exclusive setting item information (S400: YES), the CPU 11 makes the next exclusive setting group data as the process object (S410) and returns to S240. If there is no next exclusive setting group data (S420: NO), that is, the third exclusive group data 53, which is at the last of the list, has been processed in the example shown in FIG. 4, the CPU 11 terminates the exclusive setting item conflicting values checking process.

When the conflicting values checking process shown in FIGS. 6A and 6B is completed, the CPU 11 proceeds to S180 (FIG. 5) and judges whether there are conflicting values in the various setting values. Specifically, the judgment is made based on whether the return variable is set to "CONFLICTING" or not. If the return variable is set to "CONFLICTING" (S180: YES), the CPU 11 judges that the conflicting condition is occurring, and proceeds to the exclusive setting item resetting process (S190). If the return variable is not set to "COMPEING" (S180: NO), the CPU 11 judges that there is no conflicting condition, and proceeds to S200. In S200, the CPU 11 stores the setting values selected/modified by the user as the finally set values in the setting data stored in the HDD 14. Thus, when the scan is performed, the stored setting values are transmitted to the MFP 3 for use.

Figure 7:
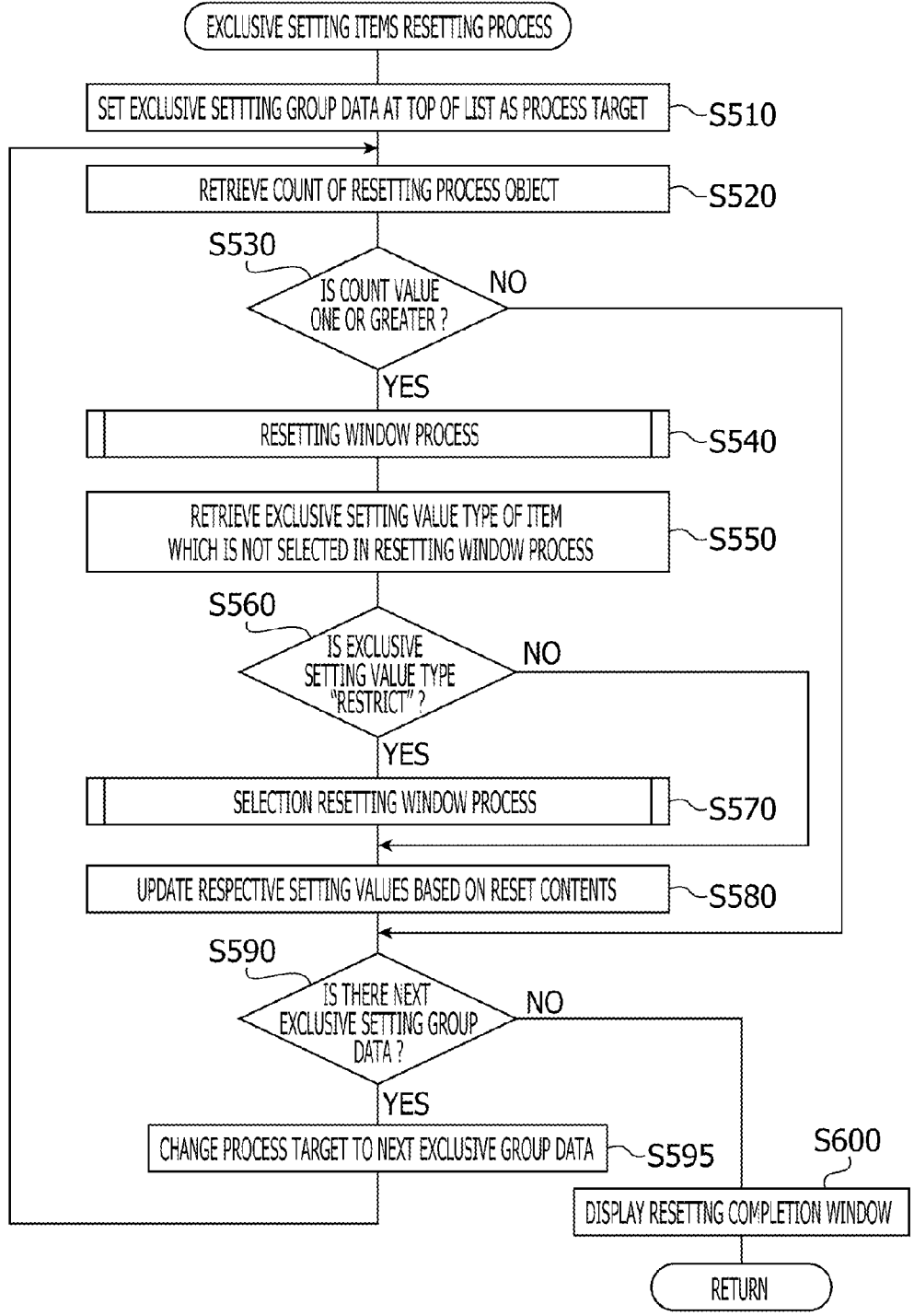
FIG. 7 is a flowchart illustrating an exclusive setting items resetting process which is called in the setting windows display process shown in FIG. 5.

The exclusive setting item resetting process (S190) is shown in FIG. 7. In S510, the CPU 11 set the exclusive setting group data at the top of the conflicting group list (FIG. 4) as the process object. Then, in S520, the CPU 11 retrieves the count of the resetting process object. In S530, the CPU 11 judges whether the retrieved count value is greater than zero or not. If the count value is not greater than zero (S530: NO), the CPU 11 proceeds to S590, otherwise (S530: YES), the CPU 11 proceeds to the resetting window process (S540).

Figure 8:
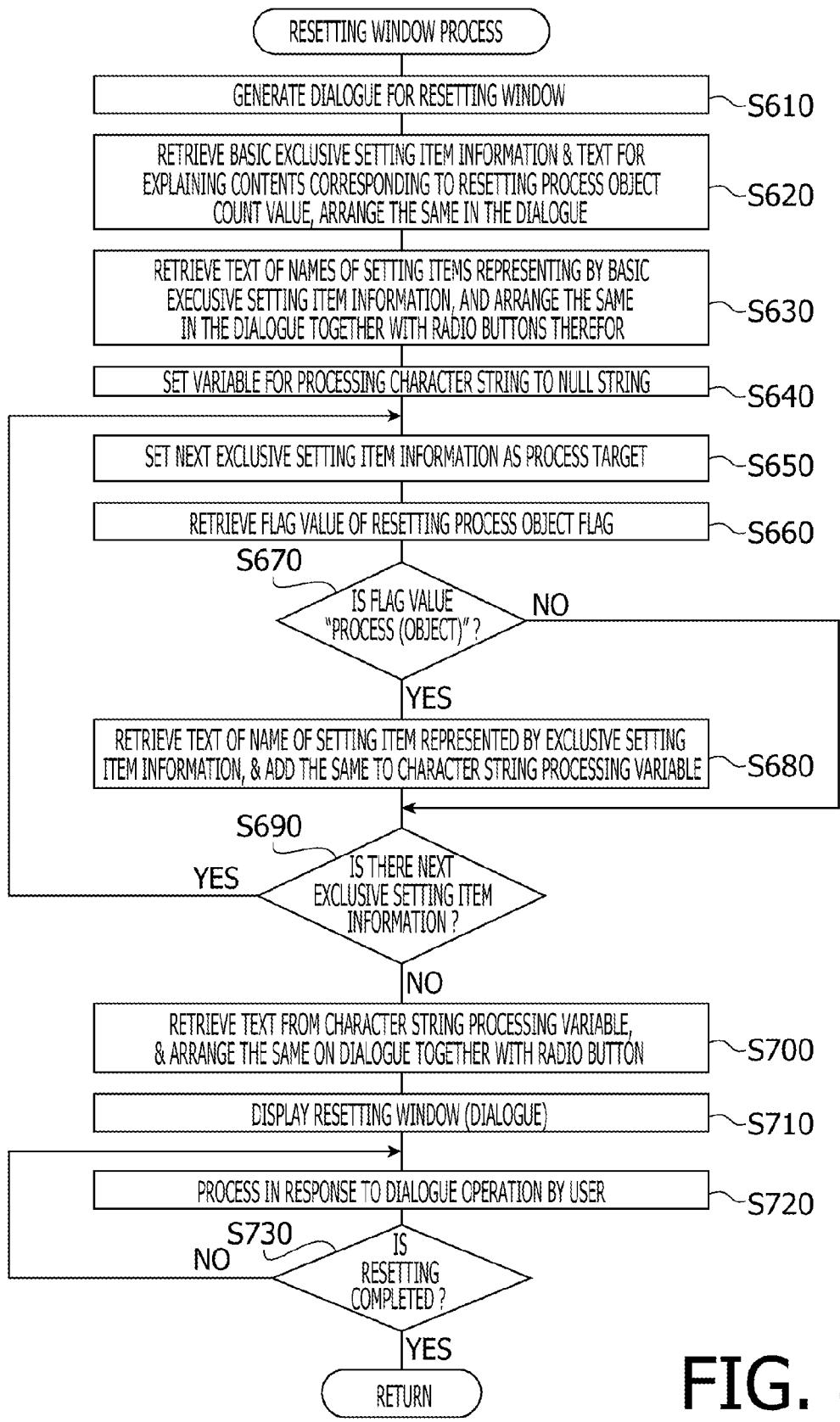
FIG. 8 is a flowchart illustrating a resetting window process which is called in the exclusive setting items resetting process shown in FIG. 7.

FIG. 8 shows the resetting window process which is called at S540 of FIG. 7. In S610, the CPU 11 generates the dialogues for resetting windows (see FIGS. 3A, 3B and 3C). Then, the CPU 11 retrieves a text for explanation corresponding to the basic exclusive setting item information and the count value for the resetting process object (S620), and arranges on the dialogues. For example, if the count value is one, the text would be ones shown in FIGS. 3A and 3C, while if the count value is two, the text would be one shown in FIG. 3B. In S630, the CPU 11 further retrieves a text of the names of the setting items represented by the basic exclusive setting item information, which are arranged on the dialogues together with the radio buttons.

Thereafter, the CPU 11 initializes a character string variable by setting a null string therein (S640), sets the process object to next exclusive setting item information in the currently processed exclusive setting group data (S650), and obtains the flag value of the resetting process object flag. In S670, the CPU 11 judges whether the obtained flag value is "OBJECTIVE" or not.

If the flag value is "NON OBJECTIVE" (S670: NO), the CPU 11 proceeds to S690. If the flag value is "OBJECT" (S670: YES), the CPU 11 obtains the text of the setting item name designated by the exclusive setting item information and add the same to the character string variable (S680). With this process, the text and radio button which are displayed in the resetting window. Specifically, the text and radio button on the second line in the item name list in the resetting window are generated.

In S690, the CPU 11 judges whether there is next exclusive setting item information. If there exists the next exclusive setting item information (S690: YES), the CPU 11 returns to S650, and executes the above-described process from S650 with setting the next exclusive setting item information to the next process object If there is not next exclusive setting item information (S690: NO), the CPU 11 proceeds to S700. In S700, the CPU 11 retrieves the text from the character string variable, and arranges the text and the radio button in the dialogue. With this process, the text indicative of the exclusive setting item and the radio button are arranged as shown on the second line of the list shown in FIGS. 3A and 3B. Then, in S710, the dialogue is actually displayed as the resetting window on the display unit 16. Thereafter, in S720, the CPU 11 executes a process in response to the user's operation of the dialogue on the resetting window. That is, a process in response to the user's operation in the resetting window as shown in FIG. 3A, 3B or 3C. Then, the CPU 11 judges whether the resetting has completed (S730). If the resetting has completed (S730: YES), the resetting window process is terminated and the CPU 11 proceeds to S550 (see FIG. 7).

In S550, the CPU 11 obtains the exclusive setting value type of the setting item which was not selected in the resetting window in the resetting window process (S540), and judges whether the obtained value type is the "RESTRCT" or not (S560). If the type value is not "RESTRCT" (S560: NO), the CPU 11 proceeds to S580. If the value type is "RESTRICT" (S560: YES), the process proceeds to the multiple-choice resetting window (S570).

Figure 9:
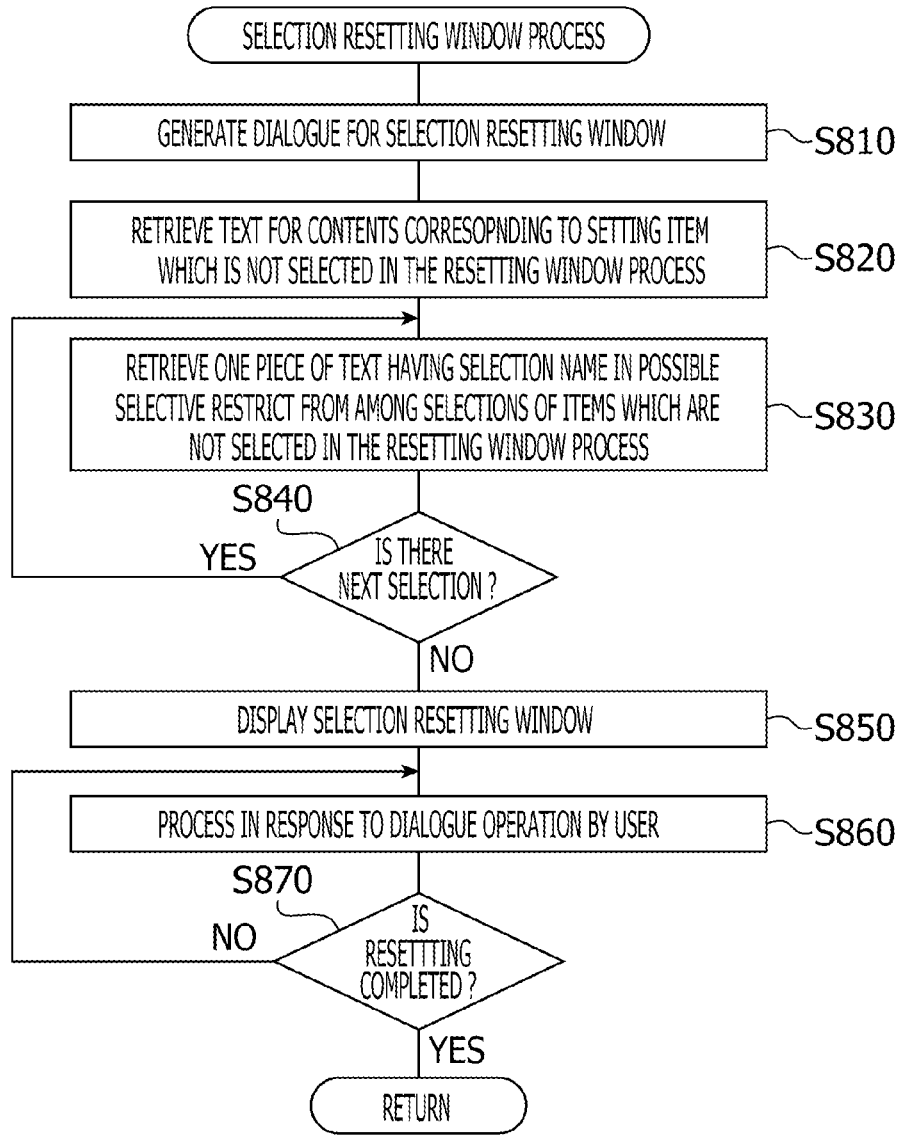
FIG. 9 is a flowchart illustrating a selection resetting process which is called in the exclusive setting items resetting process shown in FIG. 7.

The multiple-choice resetting window, which is called at S570 (see the above) is shown in FIG. 9. In S810, the CPU 11 generates a dialogue for the multiple-choice resetting window (cf. FIG. 3D), obtains the text for explanation corresponding to the setting items which were not selected in the resetting window (S820), and arrange the same in the dialogue. For example, if the "256 colors" was selected and "1200 dpi" was not selected in the resetting window of FIG. 3C, the text would be as shown in FIG. 3D. Further, in S830, the CPU 11 obtains a text of one of the names of multiple-choices within a selectable range from among the multiple-choices which were not selected in the resetting window, and arranges the same in the dialogue together with the radio button.

In S840, the CPU 11 judges whether there is a next selectable choice. As far as there is a selectable choice, the CPU 11 returns to S830 and repeats the same process. By repeating steps S830-S840, the radio buttons corresponding to the selectable choices are arranged on the dialogue as shown in FIG. 3D. In S40, if the CPU 11 judges that there is no selectable choice (S840: NO), the CPU 11 displays the multiple-choice resetting window on the display unit 16 (S850). Thereafter, the CPU 11 executes a process in response to the user's re-selecting operation on the multiple-choice resetting window (S860). Then, the CPU 11 judges whether resetting has completed. (S870). If the resetting has completed (S870: YES), the CPU 11 terminates the multiple-choice resetting process (FIG. 9) and proceeds to S580 (FIG. 7).

Figure 5:
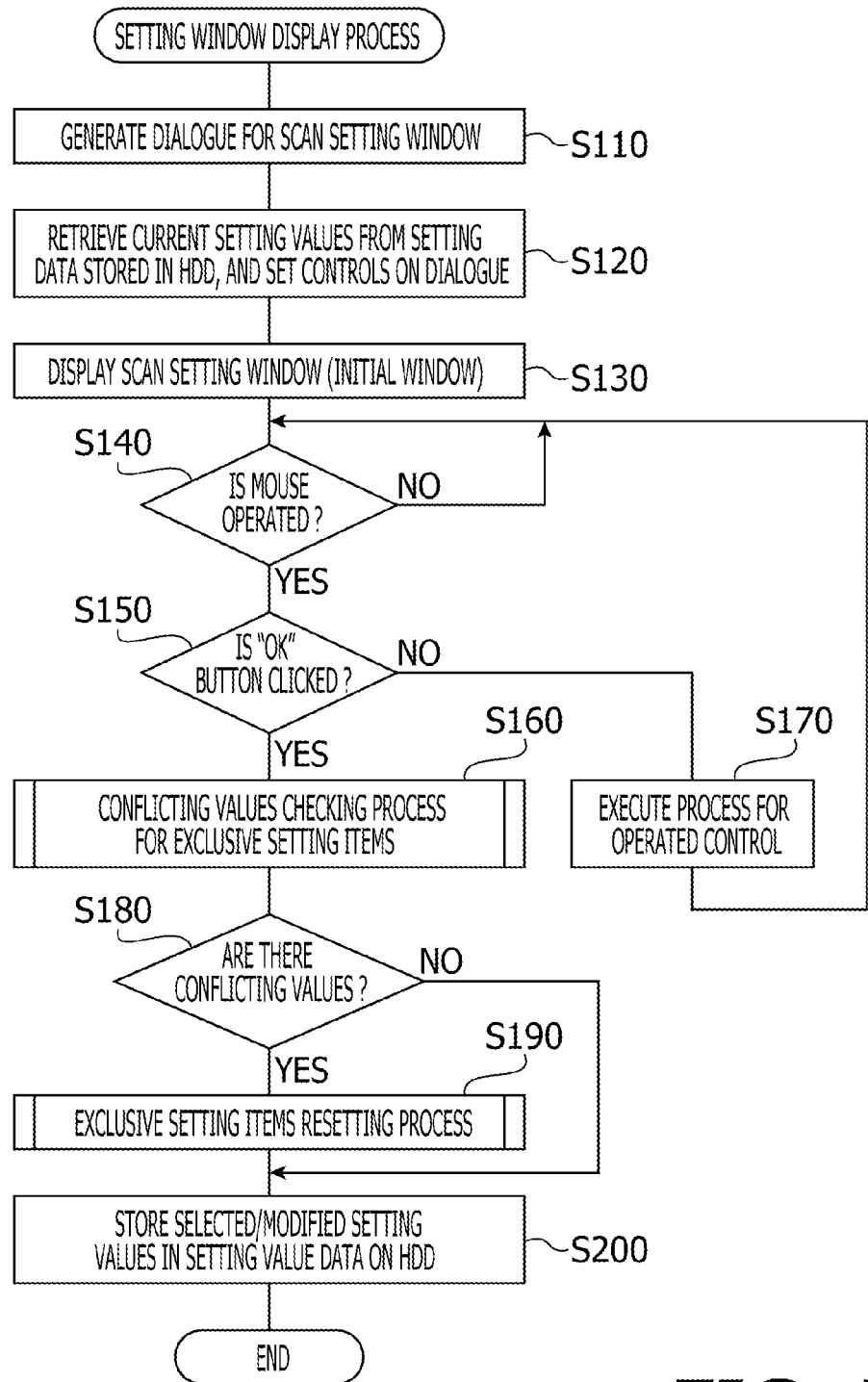
FIG. 5 is a flowchart illustrating a setting window display process executed in the PC.

In S580, the CPU 11 updates the conflicting setting values in accordance with the reset/reselect values by S570. Then, in S590, the CPU 11 judges whether there is next exclusive setting group data. If the next exclusive setting group exists (S590: YES), the CPU 11 sets the next exclusive setting group data to the process object (S595), and returns to S520. If no exclusive setting group exists (S590: NO), the CPU 11 displays a resetting completion window notifying that the resetting has completed (S600), terminates the exclusive setting item resetting process and proceeds to S200 (FIG. 5).

In S200, the setting values selected/set in the above steps are stored in the setting value data which is stored in the HDD 14, and the setting window display process is terminated.

According to the above-described information processing system 1 according to the exemplary embodiment, the user can set/select the setting items and values freely in the scan setting window and the extended setting window without being bothered by the conflicting condition. After the setting has completed, the user can recognize details of the conflicting condition if it occurs in the resetting window, and the user can easily modify the setting/selection to resolve the conflicting condition. Therefore, operability in resolving the conflicting condition is improved.

If the setting item which is not selected in the resetting window is the multi-choice setting item, the multi-choice resetting window is displayed and setting items which do not conflict with the other setting item/value are displayed in a list. Therefore, the user can recognize the selectable choice clearly, and resetting/reselecting the multi-choice setting items, although within a limited range for choice, easily.

According to the exemplary embodiment, the conflicting group list (see FIG. 4) is preliminarily prepared to judge occurrence of the conflicting condition. Therefore, whether the conflicting condition occurs or not can be judges simply and definitely.

If there are three or more conflicting setting values within single exclusive setting group data, and one of such values conflict with a plurality of other setting values (e.g., carrier sheet mode in FIG. 4), the setting value is set as the basic exclusive setting item in the conflicting group list. Using such a data structure, the conflicting group list can be configured efficiently.

Modifications

It should be noted that the present invention should not be limited to the above-described exemplary embodiment, but can be modified in various ways without departing the scope of the invention.

For example, the conflicting group list shown in FIG. 4 is only an example of such a list. Further, judging of the conflicting condition can be made in various ways. That is, using the conflicting group list is only an example of concrete methods of judging the conflicting condition.

Further, the windows shown in FIGS. 2A-2D, 3A-3D are only examples and different setting windows can be employed depending on scanning functions of the MFP 3 and/or functions of the scan-compliant software of the PC 2.

What is claimed is:

1. An information processing device, comprising:
a display device;
a control device configured to execute instructions to provide:
a setting value input unit configured to display a setting window allowing a user to input setting values for a plurality of setting items, respectively, without determining whether a conflicting condition is occurring among the setting values, the conflicting condition being a condition where a plurality of setting values which are not allowed to be set simultaneously are set simultaneously;
an input completion detecting unit configured to detect a user operation indicating a completion of input of the setting values;
a determining unit configured to determine whether at least one conflicting condition is occurring among the plurality of setting values input by the user, when the input completion detecting unit detects the user operation indicating the completion of the input of the setting values;
a first resetting unit configured to display setting items of which setting values are conflicting and setting values to be selected for resolving the conflicting condition on the display device, and allow the user to select one of the setting values when the conflicting condition determining unit determines that the at least one conflicting condition is occurring;
wherein at least one of the setting items is a multiple-choice setting item which is configured such that one of a plurality of setting values is to be input;
the information processing device including:
a multiple-choice setting item judging unit configured to judge whether a setting value which is not input, among the conflicting setting values, by the first resetting unit as a first setting value, is of the multiple-choice setting item when the conflicting condition occurs; and
a second resetting unit configured such that, when the multiple-choice setting item judging unit judges that the setting value is of the multiple-choice setting item which is not input, the second resetting unit causes the display device to display one or a plurality of non-conflicting setting values, which do not conflict with the setting value as the first setting value, from among the plurality of setting values prepared for the multiple-choice setting item as the second setting value, and configured to acquire by the user selection of the second setting value.

2. The information processing device according to claim 1, wherein the first resetting unit displays, on the display device, at least:
- a conflict notifying screen indicating only one of the conflicting setting values, or the setting value to be selected for resolving the completely conflicting condition; and
- a user-operable component allowing the user to select one of the setting values.

3. The information processing device according to claim 1, wherein the second resetting unit configured to display a window including at least the non-conflicting setting values and a user-operable component allowing the user to select one of the non-conflicting setting values on the display device as the second resetting window.

4. The information processing device according to claim 1, which has a conflicting group list listing conflicting groups,
- each conflicting group indicating a combination of conflicting setting values of each of the setting items, which setting values may cause the conflicting condition, and
- wherein the conflicting condition judging unit judges whether the conflicting condition is occurring by judging whether there exists a combination of the setting values that is included in the conflicting group list.

5. The information processing device according to claim 4, wherein one of a plurality of conflicting setting values for each conflicting group is set as a basic conflicting setting value of each conflicting group, and
wherein the conflicting condition judging unit includes:
- a first conflict judging unit configured to judge, for each conflicting group, whether a setting value identical to the basic conflicting setting value is selected by the setting value input unit; and
- a second conflict judging unit configured to judge whether, for each of the conflicting setting values other than the basic conflicting setting value in the conflicting group, the same setting value is input by the setting value input unit, when the first conflict judging unit judges that the setting value identical to the basic setting value is input,
wherein the conflicting condition judging unit judges that that the conflicting condition is occurring when the second conflict judging unit judges that, for one of the conflicting setting values, the same setting value is input.

6. The information processing device according to claim 4, wherein, for the conflicting group including more than two conflicting setting values, a setting value that has a plurality of conflicting setting values is set as the basic conflicting setting value.

7. The information processing device according to claim 1, wherein when the determining unit determines that a plurality of conflicting conditions are occurring among the plurality of setting values, the first resetting unit displays a plurality of resetting windows respectively corresponding the plurality of conflicting conditions on the display unit;
each of the plurality of resetting windows displays setting items and setting values causing the conflicting condition corresponding to the displayed resetting window, and selectable setting values, one of which is to be selected to resolve the conflicting condition; and the plurality of resetting windows are switched one by one in response to a user operation.

8. An information processing method, comprising:
displaying a setting window allowing a user to input setting values for a plurality of setting items, respectively, without determining whether a conflicting condition is occurring among the setting values, the conflicting condition being a condition where a plurality of setting values which are not allowed to be set simultaneously are set simultaneously, at least one of the plurality of setting items being a multiple-choice setting item;
detecting a user operation indicating a completion of selection input of the setting values;
determining whether at least one conflicting condition is occurring among the plurality of setting values input by the user when the user operation indicating the completion of the input of the setting values is detected;
displaying setting items of which setting values are conflicting and setting values to be selected for resolving the conflicting condition on the display device, and allowing the user to select one of the setting values when it is determined that the at least one conflicting condition is occurring;
judging whether a setting value which is not input, among the conflicting setting values, by the first resetting unit as a first setting value, is a multiple-choice setting item when the conflicting condition occurs; and
displaying one or a plurality of non-conflicting setting values, which do not conflict with the setting value as the first setting value, from among the plurality of setting values prepared for the multiple-choice setting item as the second setting value when the setting value not input is judged to be a multiple-choice setting item, and acquiring by the user selection the second setting value.

9. A computer-readable storage device which stores instructions, when executed by a computer, causes the computer to operate as:
a setting value input unit configured to display a setting window allowing a user to input setting values for a plurality of setting items, respectively, without determining whether a conflicting condition is occurring among the setting values, the conflicting condition being a condition where a plurality of setting values which are not allowed to be set simultaneously are set simultaneously;
an input completion detecting unit configured to detect a user operation indicating a completion of input of the setting values;
a determining unit configured to determine whether at least one conflicting condition is occurring among the plurality of setting values input by the user, when the input completion detecting unit detects the user operation indicating the completion of the input of the setting values;
a first resetting unit configured to display setting items of which setting values are conflicting and setting values to be selected for resolving the conflicting condition on a display device, and allow the user to selects one of the setting values when the conflicting condition determining unit determines that the at least one conflicting condition is occurring
a multiple-choice setting item judging unit configured to judge whether a setting value which is not input, among the conflicting setting values, by the first resetting unit as a first setting value, is of a multiple-choice setting item when the conflicting condition occurs; and a second resetting unit configured such that, when the multiple-choice setting item judging unit judges that the setting value is of the multiple-choice setting item which is not input, the second resetting unit causes the display device to display one or plurality of non-conflicting setting values, which do not conflict with the setting value as the first setting value, from among the plurality of setting values prepared for the multiple-choice setting item as the second setting value, and configured to acquire by the user selection of the second setting value.

10. An information processing device, comprising:

a display device;

a control device configured to execute processes of:

displaying a setting window allowing a user to input setting values for a plurality of setting items, respectively, without determining whether a conflicting condition is occurring among the setting values, the conflicting condition being a condition where a plurality of setting values which are not allowed to be set simultaneously are set simultaneously, at least one of the plurality of setting items being a multiple-choice setting item;

detecting a user operation indicating a completion of input of the setting values;

determining whether at least one conflicting condition is occurring among the plurality of setting values input by the user when the user operation indicating the completion of the input of the setting values is detected;

displaying setting items of which setting values are conflicting and setting values to be selected for resolving the conflicting condition on the display device, and allowing the user to select one of the setting values when it is determined that the at least one conflicting condition is occurring;

judging whether a setting value which is not input, among the conflicting setting values, by the first resetting unit as a first setting value, is a multiple-choice setting item when the conflicting condition occurs; and displaying one or a plurality of non-conflicting setting values, which do not conflict with the setting value as the first setting value, from among the plurality of setting values prepared for the multiple-choice setting item as the second setting value when the setting value not input is judged to be a multiple-choice setting item, and acquiring by the user selection the second setting value.

* * * * *